UNITED STATES PATENT OFFICE.

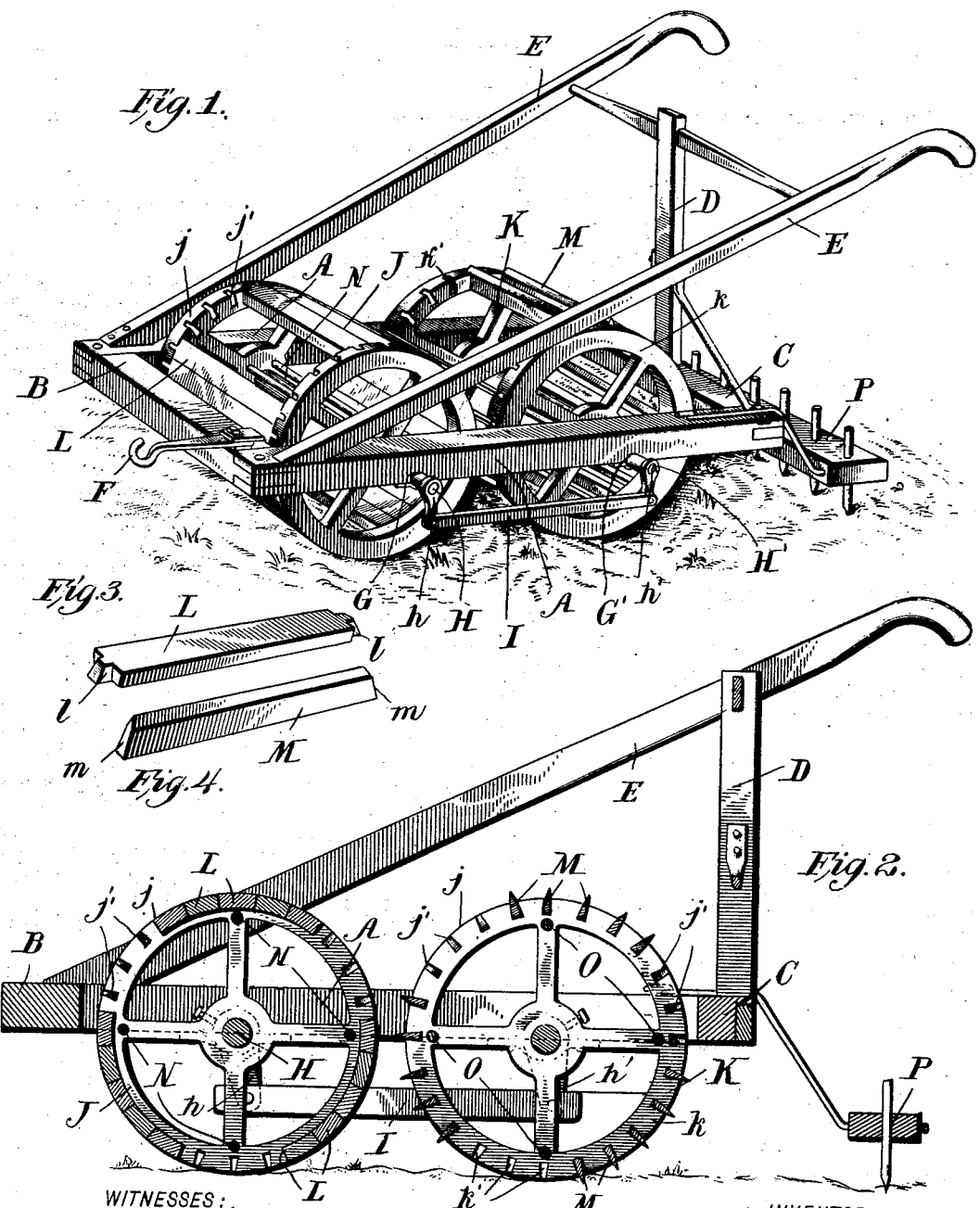

AZZERIAH D. EZZELL, OF CLINTON, NORTH CAROLINA, ASSIGNOR OF ONE-HALF TO ERASTUS COOPER, OF CLINTON, NORTH CAROLINA.

COTTON-CHOPPER.

SPECIFICATION forming part of Letters Patent No. 696,321, dated March 25, 1902.

Application filed January 13, 1902. Serial No. 89,611. (No model.)

*To all whom it may concern:*

Be it known that I, AZZERIAH D. EZZELL, a citizen of the United States, residing at Clinton, in the county of Sampson and State of North Carolina, have made certain new and useful Improvements in Cotton-Choppers, of which the following is a specification.

My invention is an improvement in cotton-choppers, and has for an object to provide a simple and novel construction whereby to first mash down the portions of the row it is desired to chop and then cut the mashed-down portions; and the invention consists in certain novel constructions and combinations of parts, as will be hereinafter described and claimed.

In the drawings, Figure 1 is a perspective view of my invention. Fig. 2 is a vertical longitudinal section thereof, and Figs. 3 and 4 are respectively detail perspective views of one of the mashing-bars and one of the cutters.

In carrying out my invention I employ a suitable frame, which may be of the rectangular form shown, with the side bars A, the front bar B, and the rear bar C and with upright D on the rear bar operating to support the rear ends of the handles E, whose front ends are connected with the frame near its front end, as shown. At its front end the frame is provided with a draft-hook F for connection with the draft devices, and the side bars of the frame are provided at G and G' with bearings for the shafts H and H' of the front and rear wheels, such shafts being provided with crank-arms $h$ and $h'$, connected by a pitman I, so the front and rear wheels will be caused to turn in unison, as will be understood from Figs. 1 and 2 of the drawings. The front and rear wheels are secured to their shafts H and H' and are both constructed with openings which operate at the same point upon the row and between said openings, the one with a flattening or rolling surface and the other with cutters. By this construction I am able to mash down the portion of the growing row which it is desired to chop and then to cut the mashed-down portion to effectually chop the cotton at the desired point in the row.

In the construction shown the front and rear wheels J and K are alike in certain respects, each being provided with rims $j$ or $k$, which are provided in their inner sides with similarly spaced-apart undercut notches $j'$ and $k'$, in which fit the tenons on the mashing-bars and the cutters presently described. The front or mashing wheel J is provided with the mashing-bars L, provided at their ends with tenons $l$, fitted to the notches $j'$ in the rims $j$, while the blades M have their ends formed at $m$ to fit in the notches $k'$ of the rims $k$. By this construction bars L and cutters M may be supplied to the wheels and removed at will to vary the width of the spaces provided in both the mashing and cutting wheels, which are designed to leave untouched the portions of the row which it is desired to leave standing. The opposite rims of the wheels J and K are held together by means of bolts N and O, which operate to secure the mashing-bars and the cutting-plates, it being understood that by tightening the rods N and O the end rims can be drawn firmly toward each other to secure the attached parts and by loosening said rods the mashing bars and cutters can be removed for any desired purpose.

A harrow P is provided at the rear of the machine to harrow the cotton after it is chopped.

Having thus described my invention, what I claim as new, and desire to secure by Letters Patent, is—

1. The cotton-chopper herein described comprising the framing provided with bearings for the wheel-shafts, the wheel-shafts provided with crank-arms, the pitman connecting said crank-arms, and the front and rear wheels on the shafts, the front wheel being constructed with rims provided in their inner faces with undercut notches and with mashing-bars held at their ends in said notches and adapted for application to the rims whereby to provide spaces between the sets of mashing-bars, and the rear wheel provided with rims and with cutting-blades held therein and arranged in sets with the adjacent sets spaced apart and such spaces arranged relatively to the spaces of the front wheel whereby they will strike the row at the same points with the spaces of the front wheel, all substantially as and for the purpose set forth.

2. A cotton-chopper comprising the front wheel provided with spaces to leave untouched portions of the row, and with mashing devices to mash certain portions of the row, the cutting-wheel in rear of the mashing-wheel and provided with openings or spaces corresponding to those of the mashing-wheel and with cutters corresponding to the mashing devices of the mashing-wheel and connections between the front and rear wheels whereby the cutters of the cutting-wheel will operate upon the portions of the row mashed by the mashing-wheel, substantially as set forth.

3. The combination of the mashing-wheel having mashing-bars and openings or spaces, the cutting-wheel having cutters and openings or spaces corresponding to those of the mashing-wheel and connections between the mashing and cutting wheels whereby they will be caused to operate in unison, substantially as set forth.

4. A cotton-chopper comprising the framing, the mashing-wheel journaled therein and having mashing devices and openings or spaces, the cutting-wheel journaled in the frame in rear of the mashing-wheel and having openings or spaces corresponding to those of the mashing-wheel and cutters corresponding to the mashing devices of the mashing-wheel, connections between the mashing-wheel and the cutting-wheel whereby the spaces and mashing devices and cutters thereof will be caused to coöperate, and the harrow in rear of the cutting-wheel, substantially as set forth.

AZZERIAH D. EZZELL.

Witnesses:
JOHN E. FOWLER,
ROBERT M. CRUMPLER, Sr.